United States Patent [19]

Hazaki et al.

[11] E Patent Number: Re. 33,473

[45] Reissued Date of Patent: Dec. 4, 1990

[54] OIL FEEDING DEVICE FOR SCROLL FLUID APPARATUS

[75] Inventors: Eiichi Hazaki, Shimizu; Masaya Imai, Ibaraki; Kenji Tojo; Masao Shiibayashi, both of Shimizu, all of Japan

[73] Assignee: Hitachi, Ltd., Tokyo, Japan

[21] Appl. No.: 126,255

[22] Filed: Nov. 25, 1987

Related U.S. Patent Documents

Reissue of:

[64] Patent No.: 4,555,224
Issued: Nov. 26, 1985
Appl. No.: 606,223
Filed: May 2, 1984

U.S. Applications:

[62] Division of Ser. No. 315,495, Oct. 27, 1981, Pat. No. 4,462,772.

[30] Foreign Application Priority Data

Oct. 31, 1980 [JP] Japan ..... 55-152077

[51] Int. Cl.[5] ..... F01C 1/04; F01C 21/04

[52] U.S. Cl. ..... 418/55.5; 418/55.6; 418/57; 418/88; 418/98; 418/151

[58] Field of Search ..... 418/55, 57, 88, 94, 418/98, 99, 151

[56] References Cited

U.S. PATENT DOCUMENTS

| | | | |
|---|---|---|---|
| 3,884,599 | 5/1975 | Young et al. | 418/55 D |
| 4,216,661 | 8/1980 | Tojo et al. | 418/57 |
| 4,343,599 | 8/1982 | Kousokabe | 418/88 |
| 4,396,364 | 8/1983 | Tojo et al. | 418/55 R |

FOREIGN PATENT DOCUMENTS

| | | | |
|---|---|---|---|
| 55-43217 | 3/1980 | Japan | 418/55 |

*Primary Examiner*—John J. Vrablik
*Attorney, Agent, or Firm*—Antonelli, Terry, Stout & Kraus

[57] ABSTRACT

An oil feeding device for a scroll fluid apparatus including an oil flow passage in the crankshaft providing oil to the crank pin bearing, an intermediate pressure chamber, and the sealed spaces between the scroll members.

16 Claims, 5 Drawing Sheets

OIL FEEDING DEVICE FOR SCROLL FLUID APPARATUS

Matter enclosed in heavy brackets [ ] appears in the original patent but forms no part of this reissue specification; matter printed in italics indicates the additions made by reissue.

BACKGROUND OF THE INVENTION

This is a division of application Ser. No. 315,495 filed Oct. 27, 1981, now U.S. Pat. No. 4,462,772.

FIELD OF THE INVENTION

This invention relates to scroll fluid apparatus suitable for use as compressors, expanders, liquid pumps, etc., and, more particularly, to an oil feeding device for the scroll fluid apparatus of the aforementioned type.

DESCRIPTION OF THE PRIOR ART

A scroll fluid apparatus of the type disclosed, for example, in U.S. Pat. No. 3,884,599 usually comprises an orbiting scroll member including an end plate, and a wrap in the form of an involute or any other curve similar thereto which is located on the end plate in upstanding position; a fixed scroll member including an end plate, a wrap in the form of an involute or any other curve similar thereto which is located on the end plate in upstanding position, and a discharge port formed in the end plate; a housing formed with a suction port and containing the orbiting scroll member and the fixed scroll member maintained in pressing engagement with each other at the surfaces of the respective end plates with the wraps facing inwardly against the end plates of the opposed scroll members; an Oldham's ring interposed between the orbiting scroll member and the housing or the fixed scroll member for preventing the rotation of the orbiting scroll member on its own axis; and a crankshaft maintained in engagement with the orbiting scroll member to enable the orbiting scroll member to move in orbiting movement by the action of the crankshaft while the orbiting scroll member does not rotate apparently on its own axis, whereby the fluid within sealed spaces defined by the two scroll members can be allowed to perform a pumping action or a pressure fluid can be supplied through the discharge port to to expand the pressure fluid to cause a drive force for rotating the crankshaft to be generated.

In scroll fluid apparatus of the aforementioned type, the crankshaft is usually of a vertical type and its shaft portion is journaled by two plain bearings or upper and lower plain bearings while its crank portion is in engagement with a plain bearing mounted at the orbiting scroll member. Oil feeding devices for feeding lubricating oil to the plain bearings journaling the shaft portion of the vertical crankshaft are disclosed, for example, in U.S. Pat. No. 4,065,279 and Japanese Patent Application Laid-Open No. 125386/80. The oil feeding devices of the prior art disclosed in these documents include oil feeding grooves extending along the axis of the shaft portion or the crank portion. One disadvantage of the oil feeding devices of the prior art referred to hereinabove would appear to be the lack of ingenuity in design with which each bearing is caused to generate an oil film reaction capable of coping with a load applied on the bearing by the fluid pressure in the sealed spaces defined by the two scroll members and by the tilting of the crankshaft in the bearings.

SUMMARY OF THE INVENTION

This invention has been developed for the purpose of obviating the above noted disadvantage of the prior art. Accordingly, the object of the present invention is to provide an oil feeding device for a scroll fluid apparatus capable of causing an optimum oil film pressure to be generated in a plain bearing at all times to avoid wear and seizure that might otherwise occur in the bearing.

According to the invention, there is provided an oil feeding device for a scroll fluid apparatus including a fixed scroll member and an orbiting scroll member arranged in combination, a crankshaft connected at its crank portion to said orbiting scroll member through a first bearing and second and third bearings for journaling said crankshaft, at least one of said bearings comprising a plain bearing, characterized in that an oil feeding means is provided on the outer peripheral surface of a portion of said crankshaft journaled by said plain bearing at a position which is spaced apart from the line of action of lateral load which is caused by fluid pressure in sealed spaces defined by the two scroll members, so as to cause a bearing oil film reaction to be generated corresponding to the lateral load.

Additional and other objects, features and advantages of the present invention will become apparent from the description set forth hereinafter when considered in conjunction with the accompanying drawings.

DESCRIPTION OF THE PREFERRED EMBODIMENTS

Figure 1:
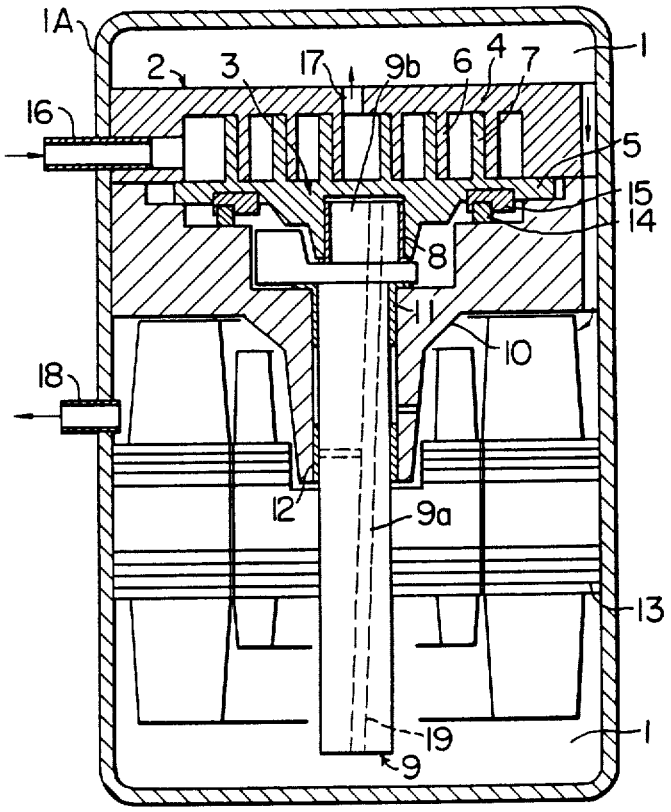
FIG. 1 is a vertical cross-sectional view of a scroll fluid apparatus incorporating therein one embodiment of the oil feeding device in accordance with the invention.
Figure 3:
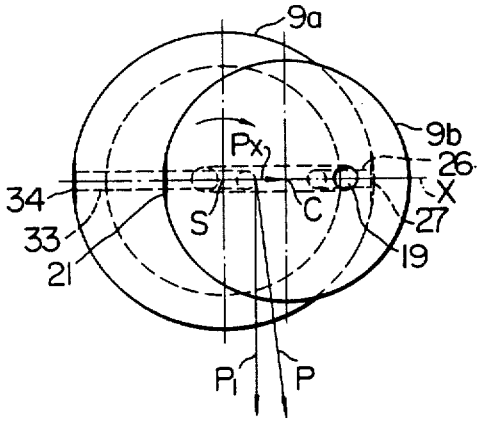
FIG. 3 is a plan view of the crankshaft showing the relationship between the oil flow passages and the direction in which loads are applied in the oil feeding device according to the invention.
Figure 2:
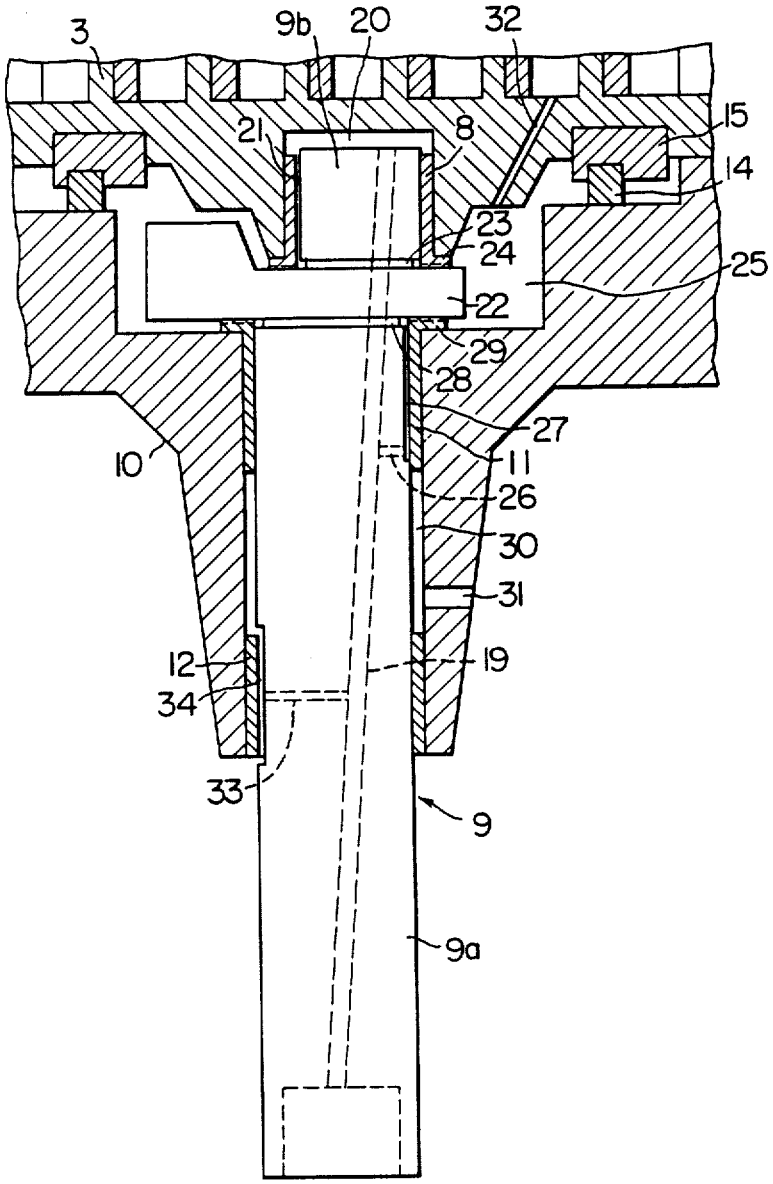
FIG. 2 is a vertical cross-sectional view, on an enlarged scale, of the portion of the crankshaft having the the oil feeding device shown in FIG. 1.

Referring now to the drawings wherein like reference numerals are used throughout the various views to designate like parts and, more particularly, to FIGS. 1–3, according to these figures, a scroll fluid apparatus, functioning, for example, as a compressor and incorporating therein oil feeding device of the invention includes a housing 1A defining a chamber 1 in which a fixed scroll member generally designated by the reference numeral 2 and an orbiting scroll member generally designated by the reference numeral 3 are disposed. The fixed scroll member 2 and the orbiting scroll member 3 includes end plates 4 and 5 and wraps 6 and 7 of vortical form located in upstanding position on the respective end plates 4 and 5. The fixed scroll member 2 and the orbiting scroll member 3 are maintained in pressing engagement with each other with the wraps 6 and 7 facing inwardly. The orbiting scroll member 3 has mounted on an underside therein a plain bearing 8 in engagement with a crank pin portion 9b of a crankshaft generally designated by the reference numeral 9 which is off center with respect to a shaft portion 9a of the crankshaft 9 journaled by an upper plain bearing 11 and a lower plain bearing 12 mounted on a frame 10. The crankshaft 9 is driven for rotation by an electric motor 13. As the crankshaft 9 rotates, the orbiting scroll member 3 moves in orbiting movement through an Oldahm's ring 14 and an Oldham's key 15, but is prevented from apparently rotating on its own axis. Fluid or gas to be compressed is sucked into sealed spaces defined between the fixed scroll member 2 and the orbiting scroll member 3 through a suction pipe 16 and compressed by the orbiting movement of the orbiting scroll member 3, and the compressed gas is discharged through an outlet 17 into the chamber 1 from which it is released through a discharge pipe 18. As the fluid sealed between the two scroll members 2 and 3 is compressed, the pressure of the fluid applies a lateral force on the orbiting scroll member 3. This lateral force is applied to the crank portion 9b through the plain bearing 8 and then transmitted to the shaft portion 9a which is borne by the plain bearings 11 and 12. Thus, due to the fluid pressure in the sealed spaces between the two scroll members, lateral or radial loads are applied on the plain bearings 8, 11 and 12, respectively. The crankshaft 9 is formed therein with an off-center oil feeding passageway 19 whose eccentricity with respect to the shaft portion 9a increases in a vertical direction. The off-center oil feeding passageway 19 draws, by suction, the oil on the bottom of the chamber 1 and feeds the same to the bearings 11 and 12 by centrifugal pumping action as the crankshaft 9 rotates.

The oil feeding device for the bearings 8, 11 and 12 will be described in detail by referring to FIG. 2. In this figure, oil is fed to the plain bearing 8 of the orbiting scroll member 3 as will be presently described. The oil on the bottom of the chamber 1 is drawn by suction by the centrifugal pumping action of the off-center oil feeding passageway 19 and introduced into an oil chamber 20 defined by the upper end of the crank portion 9b of the crankshaft 9, plain bearing 8 and orbiting scroll member 3. The oil introduced into the oil chamber 20 in this way is passed through a recessed oil flow passage 21 formed axially on the outer peripheral surface of the crank portion 9b of the crankshaft 9 to lubricate the plain bearing 8 of the orbiting scroll member 3 and the crank portion 9b. The oil that has lubricated the plain bearing 8 is discharged into an intermediate chamber 25 defined by the frame 10 and the orbiting scroll member 3 after flowing through an annular groove 23 formed in the connection between the crank portion 9b and a balance weight 22 to lubricate a thrust bearing 24 formed in the lower portion of the plain bearing 8 as a unit therewith.

Feeding of oil to the upper plain bearing 11 journaling the shaft portion 9a of the crankshaft 9 is effected by feeding the oil drawn by suction by the off-center oil feeding passageway 19 to an oil feeding aperture 26 and a recessed oil flow passage 27 formed axially on the outer peripheral surface of the shaft portion 9a and communicating with the oil feeding aperture 26. The oil that has lubricated the plain bearing 11 flows through an annular groove 28 formed in the connection between the shaft portion 9a and the balance weight 22 to a thrust bearing 29 formed in the upper portion of the bearing 11 as a unit therewith, to lubricate the thrust bearing 29 before being discharged into the intermediate chamber 25. Part of the oil that has lubricated the upper plain bearing 11 is discharged into an oil discharging chamber 30 defined by the shaft portion 9a, frame 10, plain bearing 11 and plain bearing 12 through the lower end of the plain bearing 11, to be discharged into the chamber 1 through an oil discharging aperture 31 formed in the frame 10.

The oil discharged into the intermediate chamber 25 is supplied through small openings 32 formed in the orbiting scroll member 3 to portions of the two scroll members 2 and 3 in engagement with one another. Thus, an intermediate pressure which is between the discharge pressure and the suction pressure prevails in the intermediate chamber 25. This enables oil to be fed to the upper plain bearing 11 and the plain bearing 8 of the orbiting scroll member 3 by the differential pressure between the discharge pressure and the intermediate pressure and the centrifugal pumping action of the off-center oil feeding passageway 19.

Feeding of oil to the lower plain bearing 12 journaling the shaft portion 9a of the crankshaft 9 is effected by feeding the oil drawn by suction by the off-center feeding passageway 19 to an oil feeding aperture 33 communicating with the off-center oil feeding passageway 19 and a recessed oil flow passage 34 formed axially on the outer peripheral surface of the shaft portion 9a and communicating with the oil feeding aperture 33. The oil that has lubricated the lower plain bearing 12 is discharged into the chamber 1 from the upper end of the plain bearing 12 through the oil discharging chamber 30 and oil discharging aperture 31 and at the same time discharged into the chamber 1 through the lower end of the plain bearing 12.

One of the features of the present invention is that oil feeding means for supplying lubricant oil between the plain bearings and the crankshaft 9, such as the axially extending oil flow passages 21, 27 and 34 or oil feeding apertures 26 and 33, are provided on the outer peripheral surfaces of the crankshaft 9. More specifically, the axially extending oil flow passages 21, 27 and 34 are provided by forming recessed portions on the outer peripheral surfaces of the crankshaft 9. The oil feeding apertures 26 and 33 have openings at the outer peripheral surfaces of the crankshaft 9. The inner peripheral surfaces of the plain bearings are not provided with axially extending grooves at all. Thus, the oil feeding means rotate with the crankshaft 9. In the embodiment shown, the oil flow passges 21, 27 and 34 are defined by recessed flat portions of the crankshaft 9. The flat portions may be replaced by axially extending grooves formed on the outer peripheral surfaces of the crankshaft 9.

Another feature of the present invention is that the oil feed means are located at positions spaced apart from the lines of action of lateral loads applied on the bearings. In the embodiment shown, the axially extending oil flow passages 21, 27 and 34 and the oil feeding apertures 26 and 33 are located such that, as shown in FIG. 3, they are disposed on a line X connecting the center S of the shaft portion 9a of the crankshaft 9 and the center C of the crank portion 9b thereof. As noted above, the fluid compressed in the sealed spaces between the two scroll members 2 and 3 applies a lateral force P on the orbiting scroll member 3, which is transmitted to the crank portion 9b of the crankshaft 9. It has been found that the direction of the force P is substantially perpendicular to the line X as shown in FIG. 3, at all times and moves in synchronism with the rotation of the crankshaft 9. The force P can be resolved into a component of force $P_x$ in the direction of line X and a component of force $P_1$ perpendicular to the line X. In magnitude, the components of force $P_x$ and $P_1$ are in the ratio $P_x$:$P_1$=approximately 1:8. Thus, the force P can be regarded as substantially equal to the component of force $P_1$ in magnitude and direction.

Since the oil flow passages 21, 27 and 34 are located on the line X, it can be said that the oil flow passage 21 is located at a position which is advanced for an extent of 90 degrees in the direction of rotation of the crankshaft 9 with respect to the force P, the oil flow passage 27 is located at a position which is displaced for an extent of 180 degrees with respect to the oil flow passage 21, and the oil flow passage 34 is located at a position which is displaced for an extent of 180 degrees with respect to the oil flow passage 27. The above noted positional arrangement of the oil flow passages 21, 27 and 34 is intended to locate each of them at a position which is advanced for an extent of 90 degrees in the direction of rotation of the crankshaft 9 with respect to a line of action of a lateral load and to effectively cause a bearing oil film reaction to be generated. The reason why the oil film reaction is generated will be described later. The above described positional arrangement of the oil flow passages 21, 27 and 34 is also intended to facilitate forming of the oil feeding apertures 26 and 33 which are connected to the off-center oil feeding passageway 19 which is positioned on the line X as viewed from above.

Figure 4:
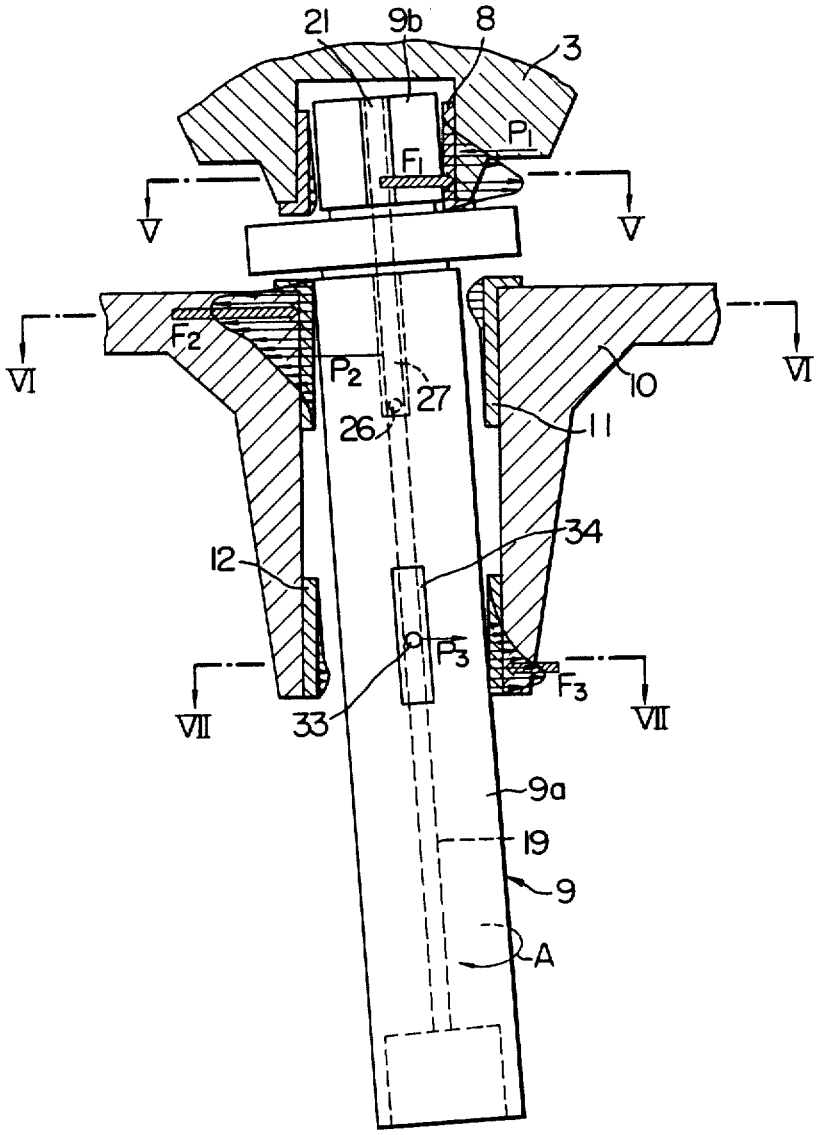
FIG. 4 is a view in explanation of the relation between the direction in which loads are applied when the crankshaft of the scroll fluid apparatus shown in FIG. 2 is rotated counterclockwise through 90 degrees and the bearing oil film pressure distribution.
Figure 5:
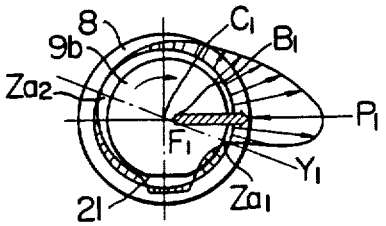
FIG. 5 is a plan view illustrating the relationship between the direction in which a load is applied to each bearing and the bearing oil film pressure distribution as seen in the direction of the arrows V—V in FIG. 4.
Figure 6:
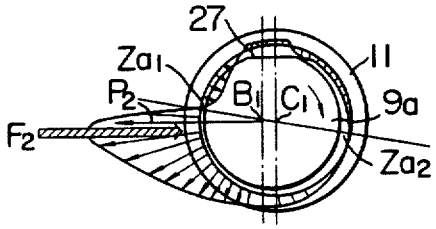
FIG. 6 is a plan view similar to FIG. 5 as viewed in a direction of the arrows VI—VI in FIG. 4.
Figure 7:
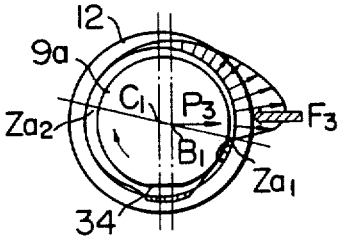
FIG. 7 is a plan view similar to FIG. 5 as viewed in a direction of the arrows VII—VII in FIG. 4.

In operation the electric motor 13 is actuated to rotate the crankshaft 9 in the direction of an arrow A or clockwise in FIG. 4. This makes the orbiting scroll member 3 move in orbiting movement with respect to the fixed scroll member 2, so as to compress gas drawn by suction through the suction pipe 16 between the two scroll members 2 and 3 and discharge the compressed gas via the discharging pipe 18. During this compression stroke, the gas in sealed spaces defined by the two scroll members 2 and 3 applies the force or load $P_1$ on the crank portion 9b of the crankshaft 9 through the orbiting scroll member 3 and the plain bearing 8. This makes the crankshaft 9 tilt between the upper plain bearing 11 and the lower plain bearing 12. As a result, a load $P_2$ acts on the upper plain bearing 11 and a load $P_3$ acts on the lower plain bearing 12. FIGS. 5-7 illustrates the relationship between the positions of the oil flow passages 21, 27 and 34 and the directions in which the loads act that are established at this time. In these figures, the force P caused by the fluid pressure is expressed as its component of force $P_1$ for the convenience of explanation. As can be clearly seen in FIGS. 5-7. the oil flow passages 21, 27 and 34 are located in positions which are advanced clockwise for an extent of 90 degrees with respect to the lines of actions of the loads $P_1$, $P_2$ and $P_3$ respectively. It will also be clearly seen that the loads $P_1$, $P_2$ and $P_3$ move in synchronism with the rotation of the crankshaft 9. Thus, the oil supplied through the oil flow passages 21, 27 and 34 to the bearing gaps of the plain bearings 8, 11 and 12 generates oil film reactions $F_1$, $F_2$ and $F_3$ corresponding to the loads $P_1$, $P_2$ and $P_3$, respectively, as shown in FIGS. 5-7. As described hereinabove, the positional relations between the lines of actions of the loads $P_1$, $P_2$ and $P_3$ and the oil flow passages 21, 27 and 34, respectively, are constant for the respective bearings, so that the oil film pressure generated in each bearing is substantially similar. The oil film pressure distribution formed between the plain bearing 8 and the crank portion 9b shown in FIG. 5 will be described in some detail.

The crank portion 9b has its center C1 displaced by the load from the center B1 of the plain bearing 8. A minimum gap position $Za_1$ is formed on a side of the line $Y_1$ connecting the centers $C_1$ and $B_1$ together on which the load $P_1$ acts, and a maximum gap position $Za_2$ is formed on the opposite side. The oil introduced from the oil flow passage 21 under the oil supply pressure is withdrawn to the bearing gap between the crank portion 9b and the plain bearing 8 by the rotation of the crank portion 9b as well as the oil supply pressure, and forcibly fed into the region of bearing gap which is narrowing with respect to the direction of rotation of the crank portion 9b. That is, what is generally referred to as a wedging action occurs. By virtue of the wedging action, the oil film pressure rises starting at the maximum gap position $Za_2$ and is maximized before the minimum gap position $Za_1$ is reached, thereby generating an oil film pressure $F_1$ corresponding to the load $P_1$. Thereafter the oil film pressure drops and substantially reaches an intermediate pressure at the minimum gap position $Za_1$. In the region of widening bearing gap from the minimum gap position $Za_1$ formed along the direction of rotation of the crank portion 9b, the oil film pressure begins to drop starting at the minimum gap position $Za_1$ and becomes lower than the intermediate pressure. Thereafter the oil film pressure rises again after reaching the minimum value, until it reaches the oil supply pressure at the oil flow passage 21. Since the bearing gap is widening between the oil flow passage 21 and the maximum gap position $Za_2$ with respect to the direction of rotation of the crank portion 9b, the oil film pressure drops and then gradually rises again until it substantially reaches the intermediate pressure level at the maximum gap position $Za_2$.

As described hereinabove, the oil film pressures $F_1$-$F_3$ can be produced continuously and optimally on the bearings 8, 11 and 12, respectively, which are sufficiently high to bear the loads $P_1$-$P_3$ on their sliding surfaces. The oil film pressures $F_1$-$F_3$ act in a manner to reduce the tilting of the crankshaft 9 within the respective bearings that might otherwise be increased by the loads $P_1$-$P_3$. As a result, the crankshaft 9 is prevented from contacting the bearings 8, 11 and 12 at one side only, thereby avoiding wear and seizure of the bearings 8, 11 and 12. Also, since the oil flow passages 21, 27 and 34 are located at all times in positions which are displaced from the minimum gap positions of the bearings, the oil flow passages 21, 27 and 34 never scratch the portions of the crankshaft 9 that might tend to contact the bearings at one side only. Moreover, the arrangement that the oil flow pasages 21 and 37 open in the intermediate chamber 25 and the oil flow passage 34 opens in the chamber 1 enables the avoidance of a malfunctioning in oil feeding that might otherwise occur due to precipitation as gas bubbles of the gas dissolved in the oil and collection thereof in the oil feeding passageways. This is conducive to prevention of a reduction in the volume of oil fed to the bearings. Also, since the oil flow passages 21, 27 and 34 rotate with the crankshaft 9, fresh oil is supplied to the bearing surfaces at all times, thereby enabling the bearings to be effectively cooled.

Figure 8:
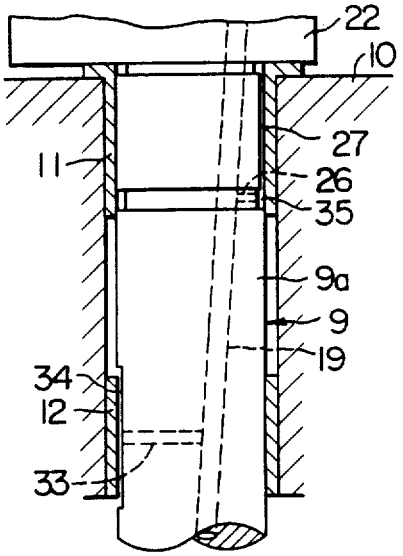
FIG. 8 is a vertical cross-sectional view of the oil feeding device comprising another embodiment of the invention.
Figure 9:
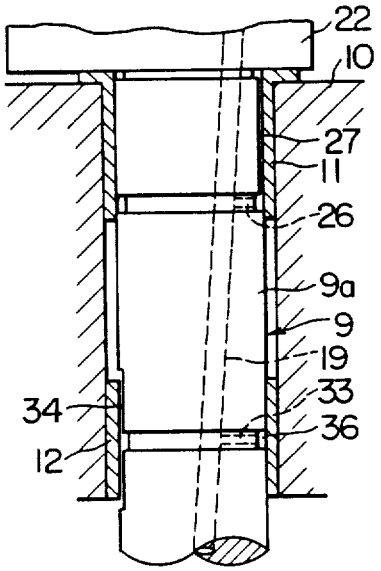
FIG. 9 is a vertical cross-sectional view of the oil feeding device comprising still another embodiment of the invention.

In order to increase the effects achieved in producing the oil film pressures and cooling the bearings, annular grooves 35 and 36 may be formed on the outer circumferential surface of the shaft portion 9a in positions corresponding to the positions in which the oil feeding passageways 26 and 33 communicating with the off-center oil feeding passageway 19 open in the oil flow passages 27 and 34, respectively, as shown in FIGS. 8 and 9. By this arrangement, it is possible to feed oil not only through the oil flow passages 27 and 34 but also through the annular grooves 35 and 36. This is conducive to increased volume of the oil fed to the bearings and increased oil film pressures as well as improved cooling of the bearings. The positions of the annular grooves 35 and 36 are not limited to those described hereinabove, and they may be formed on the bearing side.

Figure 10:
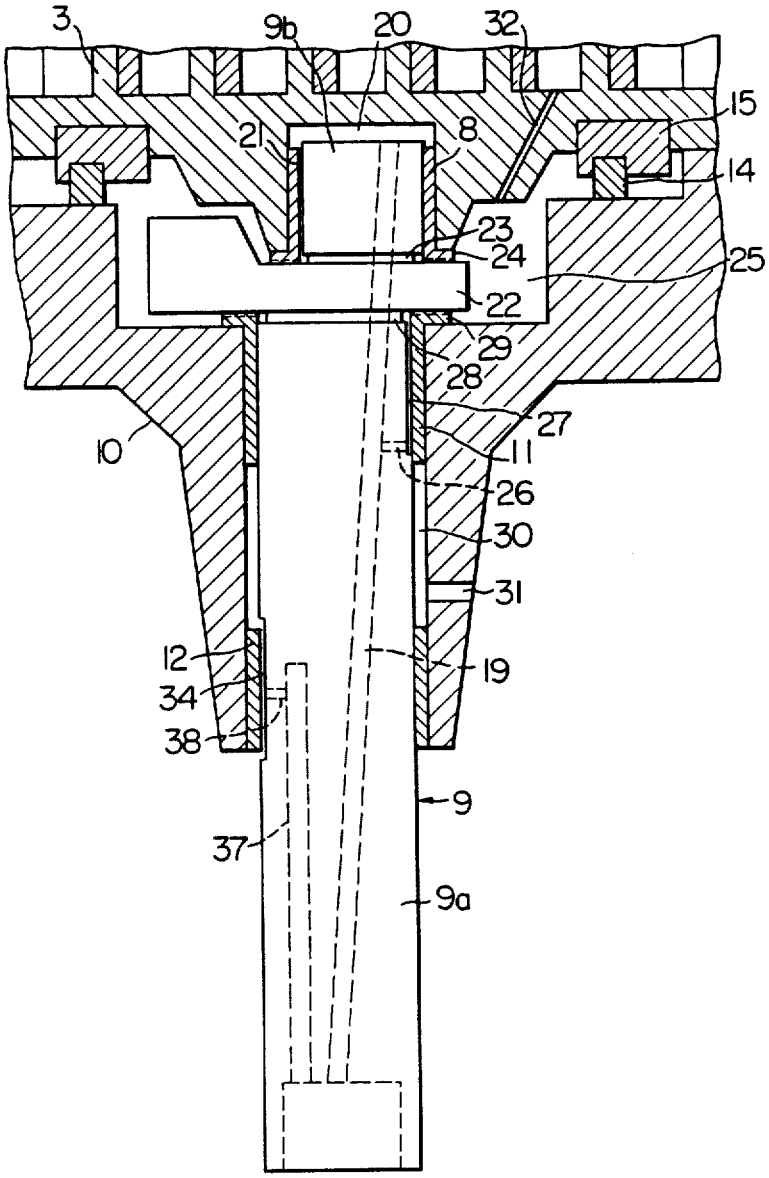
FIG. 10 is a vertical cross-sectional view of the oil feeding device comprising a further embodiment of the invention.

In the embodiments shown and described hereinabove, feeding of oil to the plain bearing 8 is effected by feeding oil in the oil chamber 20 above the crank portion 9b through the oil below passage 21 to the bearing 8. However, an oil feeding passageway communicating the off-center feeding passageway 19 with the oil flow passage 21 may be additionally formed in the crank portion 9b. To more suitably supply oil to the lower plain bearing 12 journaling the shaft portion 9a than to any other bearings, as shown in FIG. 10 an off-center oil passageway 37 and an oil feeding aperture 38 may be formed for the bearing 12 in the shaft portion 9a. It is to be understood that the present invention can have application in cases where any one of the bearings 8, 11 and 12 is a roller bearing. In the description set forth hereinabove, the oil flow passages 21, 27 and 34 have been described as being located in positions which are advanced in the rotational direction of the crankshaft for an extent of 90 degrees with respect to the lines of actions of the loads $P_1$, $P_2$ and $P_3$ respectively. However, the positions of the passages 21, 27 and 34 are not limited to those described in the above embodiment any may be changed to any positions which are spaced apart from the lines of action of the loads $P_1$–$P_3$ so that generation of oil film pressures $F_1$, $F_2$ and $F_3$ corresponding to the loads $P_1$, $P_2$ and $P_3$ due to the wedging action would not significantly be affected by the oil flow passages. The oil flow passage is preferably located in the region which are advanced in the rotational direction of the crankshaft from 45 degrees to 315 degrees with respect to the line of action of the load $P_1$, $P_2$ or $P_3$. In addition, the directions of the loads $P_1$, $P_2$ and $P_3$ are influenced and varied by the centrifugal force exerting on the orbiting scroll member 3, which acts in a direction opposite to the direction in which the component of the force $P_x$ acts in FIG. 3. Thus, the oil flow passages 21, 27 and 34 are preferably located in positions which are out of this variation zone.

From the foregoing description, it will be appreciated that in the prefered embodiment, an oil film reaction within each plain bearing is produced at all times, though the fluid pressure between the two scroll members applied a lateral load on the crank portion of the crankshaft and causes tilting of the crankshaft in the plain bearings, whereby wear and seizure of the bearings can be prevented from taking place.

What is claimed is:

1. A scroll fluid apparatus comprising:

a fixed scroll member having an end plate *and a wrap* located in an upstanding position on the end plate;

an orbiting scroll member having an end plate and a wrap located in an upstanding position on the end plate of the orbiting scroll member and engaging with the fixed scroll member to form a plurality of sealed spaces therebetween;

frame means connected to the fixed scroll member;

first [and] *bearing means provided on said orbiting scroll member;* second bearing means mounted on the frame means;

a crankshaft having a shaft portion and a crank portion, said crank portion engaging with the orbiting scroll member through the first bearing means and said shaft portion being rotatably supported by the second bearing means;

balance weight means formed on the crankshaft and located between the shaft portion and the crank portion;

an intermediate chamber defined by the frame means and the end plate of the orbiting scroll member;

small opening means through which the intermediate chamber communicates with the sealed spaces;

an oil chamber defined by an end surface of the crank portion and the end plate of the orbiting scroll member;

an oil feeding passage means formed in the crankshaft and extending from an end of the shaft portion to the end surface of the crank portion, said oil feeding passage means communicating with the oil chamber;

an Oldham's ring and key means arranged between the frame means and the end plate of the orbiting scroll member for preventing the orbiting scroll member from rotating on its own axis;

drive means connected to the crankshaft;

sealed housing means defining a chamber for accommodating all the previous elements, said chamber defined by said housing means being isolated from said intermediate chamber;

an outlet port means formed in the fixed scroll member for enabling the sealed spaces to communicate with said chamber defined by the housing means;

suction pipe means mounted on the housing means so as to communicate with the sealed spaces; and discharge pipe means mounted on the housing means so as to communicate with the chamber defined by the housing means.

2. A scroll fluid apparatus as claimed in claim 1, wherein the first bearing means includes a plain bearing having an upper end facing the oil chamber and a lower end facing the intermediate chamber.

3. A scroll fluid apparatus including:

a fixed scroll member having an end plate and a wrap;

an orbiting scroll member having an end plate and a [warp end] *wrap and* engaging with the fixed scroll member to form a plurality of sealed spaces therebetween;

a crank shaft having a shaft portion and a crank pin portion, said crank *pin* portion being off center with respect to the shaft portion;

first bearing means arranged between the orbiting scroll member and the crank pin portion to rotatably engage the orbiting scroll member with the crank pin portion;

frame means supporting the crankshaft;

second bearing means including at least one bearing arranged between the crankshaft and the frame means;

drive means connected to the crankshaft;

means for preventing the orbiting scroll member from rotating on its own axis;

sealed housing means for defining a chamber for accommodating the fixed and orbiting scroll members, the crankshaft, the frame means, the first and second bearing means, the drive means and the preventing means;

intermediate chamber defined by the frame means and the end plate of the orbiting scroll member and located between the first bearing means and second bearing means, said intermediate chamber being isolated from the chamber defined by said housing means;

opening means through which the intermediate chamber communicates with the sealed spaces so that a pressure in the intermediate chamber is maintained in an intermediate pressure between a suction pressure and a discharge pressure of the scroll fluid apparatus;

an oil chamber defined by an end surface of the crank pin portion and the end plate of the orbiting scroll member; and an off-center oil feeding passage means formed in the crankshaft and extending from an end of the shaft portion to the end surface of the crank pin portion, said oil feeding passage means communicating with the oil chamber, so as to provide for a first oil flow from an oil collected in a bottom of the housing means through the oil feeding passage means to the oil chamber, a second oil flow from the oil chamber, passing through an upper end of the first bearing means toward a lower end of the first bearing means, a third oil flow from the lower end of the first bearing means to the intermediate chamber, and a fourth oil flow from the intermediate chamber through the opening means to the sealed spaces.

4. A scroll fluid apparatus as claimed in claim 3, wherein said first oil flow is produced by a pressure difference between a discharge pressure in the chamber defined by said housing means and the intermediate pressure and by a pumping action of the oil feeding passage means.

5. A scroll fluid apparatus as claimed in claim 3, wherein said first bearing means includes a plain bearing and the crank *pin* portion is formed, at an outer peripheral surface engaging with the plain bearing, with an oil flow passage extending axially of the crankshaft.

6. A scroll fluid apparatus as claimed in claim 4, wherein said opening means is formed in the end plate of the orbiting scroll member.

*7. A scroll fluid apparatus comprising:*

*a fixed scroll member having an end plate;*

*an orbiting scroll member having an end plate;*

*means provided on said fixed and orbiting scroll members for forming a plurality of sealed spaces;*

*a frame means;*

*a rotatably supported crank shaft having a shaft portion and a crank portion engaging with the orbiting scroll member;*

*an intermediate chamber defined by the frame means and the end plate of the orbiting scroll member;*

*small opening means through which the intermediate chamber communicates with the sealed spaces;*

*an oil chamber defined by an end surface of the crank portion and the end plate of the orbiting scroll member;*

*oil feeding passage means formed in the crank shaft and having a first end communicating with the oil chamber and a second end in communication with the oil storage means;* sealed housing means for defining a chamber for accommodating all of the previous elements, said chamber defined by said housing means being isolated from said intermediate chamber;

an outlet port means for enabling the sealed spaces to communicate with said chamber defined by said housing means; and

*wherein said intermediate chamber and said oil chamber respectively receive pressures of two different pressure levels, said pressures acting on a back face of said orbiting scroll member end plate remote from said sealed spaces.*

*8. A scroll fluid apparatus according to claim 7, further comprising first and second bearing means, said crank portion engaging the orbiting scroll member through the first bearing means and said second bearing means rotatably supporting the shaft portion.*

*9. A scroll fluid apparatus as claimed in claim 8, wherein the first bearing means includes a plane bearing having a first end facing the oil chamber and a second end facing the intermediate chamber.*

*10. A scroll fluid apparatus according to claim 7, further comprising means for preventing said orbiting scroll member from rotating about its own axis.*

*11. A scroll fluid apparatus comprising:*

*a fixed scroll member having an end plate and a wrap on the end plate;*

*an orbiting scroll member having an end plate and a wrap on the end plate of the orbiting scroll member and engaging with the fixed scroll member to form a plurality of sealed spaces therebetween;*

*a frame means;*

*a rotatably supported crank shaft having a shaft portion and a crank portion, said crank portion engaging with the orbiting scroll member through first bearing means and said shaft portion being mounted on the frame means through second bearing means;*

*an intermediate chamber defined by the fame means and the end plate of the orbiting scroll member;*

*small opening means through which the intermediate chamber is communicated with the sealed spaces;*

*an oil chamber defined by an end surface of the crank portion and the end plate of the orbiting scroll member;*

*an oil feeding passage means formed in the crank shaft and having an end communicating with the oil chamber;*

*sealed housing means for defining a chamber for accommodating all the previous elements, said chamber*

*defined by said housing means being isolated from said intermediate chamber;*

*an outlet port means for enabling the sealed spaces to communicate with said chamber defined by said housing means;*

*suction pipe means for communicating with the sealed spaces;*

*discharge pipe means for communicating with the chamber defined by the housing means; and*

*said intermediate chamber and said oil chamber respectively receive pressures of two different pressure levels, said pressures acting on a back face of said orbiting scroll member end plate remote from said sealed spaces.*

*12. A scroll fluid apparatus as claimed in claim 11, wherein the first bearing means includes a plain bearing having a first end facing the oil chamber and a second end facing the intermediate chamber.*

*13. A scroll fluid apparatus including:*

*a fixed scroll member having an end plate and a wrap;*

*an orbiting scroll member having an end plate and a wrap and engaging with the fixed scroll member to form a plurality of sealed spaces therebetween;*

*a crank shaft having a shaft portion and a crank pin portion, said crank pin portion being off center with respect to the shaft portion;*

*first bearing means arranged between the orbiting scroll member and the crank pin portion to rotatably engage the orbiting scroll member with the crank pin portion;*

*frame means supporting the crankshaft;*

*second bearing means including at least one bearing arranged between the crankshaft and the frame means;*

*drive means connected to the crankshaft;*

*means for preventing the orbiting scroll member from rotating on its own axis;*

*sealed housing means for defining a chamber for accommodating the fixed and orbiting scroll members, the crankshaft, the frame means, the first and second bearing means, the drive means and the preventing means;*

*an intermediate chamber defined by the frame means and the end plate of the orbiting scroll member and located between the first bearing means and second bearing means, said intermediate chamber being isolated from the chamber defined by said housing means;*

*opening means through which the intermediate chamber communicates with the sealed spaces so that a pressure in the intermediate chamber is maintained in an intermediate pressure between a suction pressure and a discharge pressure of the scroll fluid apparatus;*

*an oil chamber defined by an end surface of the crank pin portion and the end plate of the orbiting scroll member; and*

*an oil feeding passage means formed in the crankshaft and having an end communicating with the oil chamber so as to provide for a first oil flow from the chamber defined by the housing means through the oil feeding passage means to the oil chamber, a second oil flow from the oil chamber passing through a first axial end of the first bearing means toward a second axial end of the first bearing means, a third oil flow from the second axial end of the first bearing means to the intermediate chamber, and a fourth oil flow from the intermediate chamber through the opening means to the sealed spaces.*

*14. A scroll fluid apparatus as claimed in claim 13, wherein said first oil flow is produced by a pressure difference between a discharge pressure in the chamber defined by said housing means and the intermediate pressure and by a pumping action of the oil feeding passage means.*

*15. A scroll fluid apparatus as claimed in claim 13, wherein said first bearing means includes a plain bearing and a crank pin portion is formed, at an outer peripheral surface engaging with the plain bearing, with an oil flow passage extending axially of the crankshaft.*

*16. A scroll fluid apparatus as claimed in claim 14, wherein said opening means is formed in the end plate of the orbiting scroll member.*

* * * * *